Patented June 5, 1934

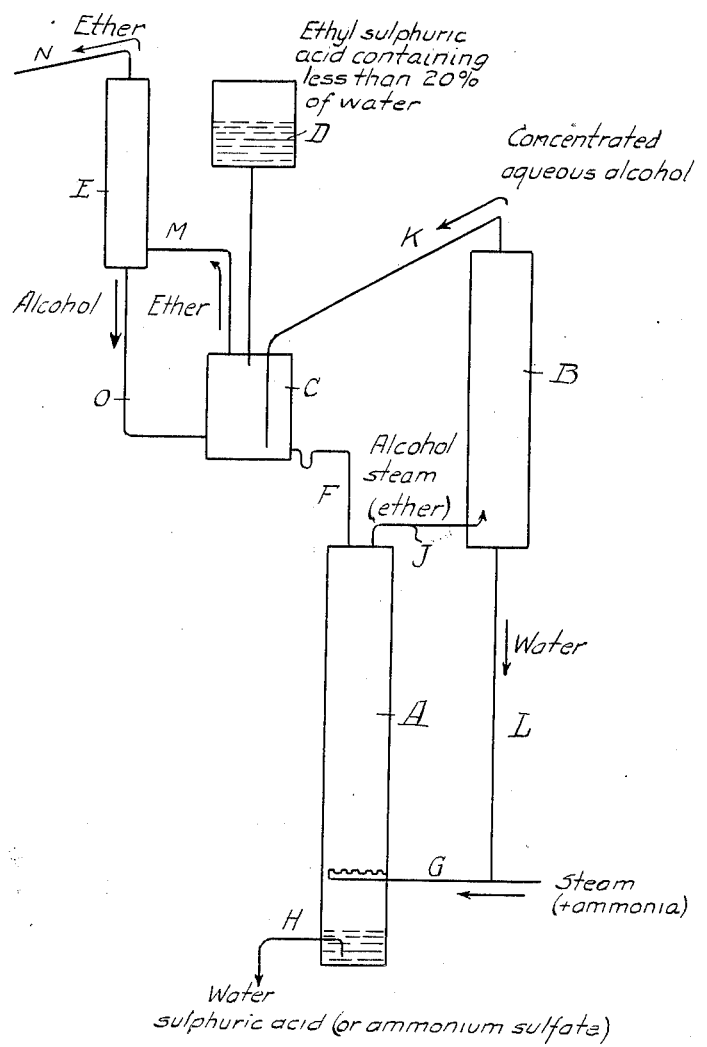

1,961,987

UNITED STATES PATENT OFFICE 1,961,987

PRODUCTION OF ETHERS

Curt Schumann and Hanns Ufer, Ludwigshafen-on-the-Rhine, Germany, assignors to I. G. Farbenindustrie Aktiengesellschaft, Frankfort-on-the-Main, Germany Application July 30, 1931, Serial No. 553,969
In Germany August 8, 1930

4 Claims. (Cl. 260—151)

The present invention relates to improvements in the production of ethers.

It is already known that alkyl sulphuric acids, obtainable by introducing ethylene or its homologues into sulphuric acid, and especially ethyl sulphuric acid, can be transformed directly into ethers. When, however, undiluted or moderately diluted ethyl sulphuric acid is heated only traces or small amounts of ether are obtained owing to incomplete conversion of the sulphate, whilst on heating with larger quantities of water the formation of alcohol preponderates. In order to overcome these difficulties it has already been proposed, for the purpose of obtaining an ether as free as possible from alcohol, to pass the alcohol-bearing vapours of ether, obtained by boiling ethyl sulphuric acid with water, through one or more vessels containing ethyl sulphuric acid or sulphuric acid, or a mixture of both, either in a concentrated state or with a content of water gradually diminishing in the vessels arranged in series. But also this process is attended with difficulties in the practical application thereof because the impossibility of obtaining complete hydrolysis even at high temperatures with the small quantities of water employed even when the period of reaction is greatly extended, while, in this case also, a greater dilution with water, which would effect a rapid and complete conversion of the ethyl sulphuric acid again results in larger or smaller amounts of alcohol passing over in the ether during distillation.

We have now found that ethers can be produced from alkyl sulphuric acid in a simple and continuous manner by partially freeing from water, in an attached column, the alcoholic vapours formed by the practically complete hydrolysis of already partially decomposed alkyl sulphuric acid and bringing the resulting vapours into contact with the corresponding undecomposed alkyl sulphuric acid heated to temperatures above 100° C.

The process can be carried out in various ways. The accompanying diagrammatic drawing illustrates an arrangement of apparatus for carrying out the process according to this invention but the invention is not restricted thereto. Partially decomposed alkyl sulphuric acid, such as ethyl sulphuric acid, is introduced through pipe F into a tower A charged for example with fillers, pumice or discs like a fractionating column, and is completely hydrolized by a counterflow of steam blown in through the pipe G. The resulting dilute acid mixture, which only contains trifling amounts of ethyl sulphuric acid, if any, issues continuously at H. The volatile products of saponification, such as alcohol, steam and sometimes ethyl ether, distil off through the pipe J and reach a column B which is maintained at such a temperature that the alcoholic vapours passing off through the pipe K contain a quantity of water vapour as is necessary for the formation of ether in the vessel C, for example at from 80° to 92° C. if di-ethyl ether be produced. The condensate, chiefly water, flowing out of the column B can be returned to the saponification process by way of the pipes L and G or it may be passed to the central or upper portion of the tower A. The vapour of concentrated alcohol distilling over from the column B through the pipe K passes into the vessel C, in which it is brought into contact at temperatures exceeding 100° C. with fresh and preferably slightly diluted alkyl sulphuric acid containing less than 20 per cent of water admitted continuously from the storage vessel D and running off through the pipe F. The vessel C is preferably in the form of a tower containing Raschig rings, pumice lumps or like inert filler bodies, aqueous vapours of alcohol issuing from the pipe K contacting with ethyl sulphuric acid in said tower in counter current and ethyl sulphuric acid running from said tower C to the tower A through the pipe F which is preferably provided with a liquid seal preventing vapours from passing from the tower A to the tower C. The ether formed distils off through the pipe M and is rectified in an adjacent column E from which it issues through the pipe N. The condensate, chiefly ethyl alcohol, flowing back out of the column E is returned, through the pipe O to the vessel C or also to the column B, or in the upper portion of the tower A.

The process can be modified in a variety of ways. Thus for example the saponification in the tower A may be effected in place of with water alone with the simultaneous admission of ammonia so that the direct production of ammonium sulphate can be combined with the process. In order to preclude undesirable secondary reactions, it is usually of advantage to dilute the alkyl sulphuric acid supplied from the vessel D prior to heating, especially when the working temperature exceeds 120° C. for example when ethyl sulphuric acid is employed. In such a case, the diluent may consist of water, or also the vapours, or a portion of the vapours resulting from the saponification of the alkyl sulphuric acid in the tower A. The dilution may also be performed for example by connecting the outlet of the vessel D with the pipe K. The dilution, however, must only be carried to the point at which it does not unfavourably affect the formation of ether, say up to 10, 20, or at the most 25 per cent. In order to free the ether formed from any small quantities of sulphurous acid, a purification step may be intercalated between C and E, as for example by a washing tower fed with milk of lime, or solutions of caustic soda or of sodium carbonate kept at from 60° to 80° C.

The starting materials may comprise alkyl sulphuric acids obtained by the most divergent processes, such for example as by the absorption of ethylene or other olefines such as propylene or butylene, or mixtures of the same, by means of sulphuric acid. A content of di-alkyl sulphate even when high has no adverse effect on the process, since di-alkyl sulphate is also converted in a practically complete manner in the process.

What we claim is:—

1. In the production of di-ethyl ether from ethyl sulphuric acid by heating the latter in the presence of water and distilling off the ether formed, the steps which comprise continuously subjecting the remaining mixture comprising ethyl sulphuric acid, sulphuric acid, ethyl alcohol and water to fractional distillation and contacting the resulting vaporous mixtures of concentrated aqueous ethyl alcohol with fresh ethyl sulphuric acid at a temperature above 100° C., while continuously distilling off the ether formed and passing the resulting mixture to the said fractional distillation.

2. In the production of di-ethyl ether from ethyl sulphuric acid by heating the latter in the presence of water and distilling off the ether formed, the steps which comprise continuously subjecting the remaining mixture comprising ethyl sulphuric acid, sulphuric acid, ethyl alcohol and water to fractional distillation in the presence of steam and contacting the resulting vaporous mixtures of concentrated aqueous ethyl alcohol with fresh ethyl sulphuric acid at a temperature above 100° C., while continuously distilling off the ether formed and passing the resulting mixture to the said fractional distillation.

3. In the production of di-ethyl ether from ethyl sulphuric acid by heating the latter in the presence of water and distilling off the ether formed, the steps which comprise continuously practically completely hydrolyzing the ethyl sulphuric acid present in the remaining mixture comprising sulphuric acid, ethyl alcohol and water besides said ethyl sulphuric acid, while continuously fractionating the vapours formed, and contacting the resulting vaporous mixtures of concentrated aqueous ethyl alcohol with fresh ethyl sulphuric acid at a temperature above 100° C., while continuously distilling off the ether formed and passing the resulting mixture to the said fractional distillation.

4. In the production of di-ethyl ether from ethyl sulphuric acid by heating the latter in the presence of water and distilling off the ether formed, the steps which comprise continuously practically completely hydrolyzing the ethyl sulphuric acid present in the remaining mixture comprising sulphuric acid, ethyl alcohol and water besides said ethyl sulphuric acid, while continuously fractionating the vapours formed in the presence of steam, and contacting the resulting vaporous mixtures of concentrated aqueous ethyl alcohol with fresh ethyl sulphuric acid at a temperature above 100° C., while continuously distilling off the ether formed and passing the resulting mixture to the said fractional distillation.

CURT SCHUMANN.
HANNS UFER.